United States Patent Office 2,774,660
Patented Dec. 18, 1956

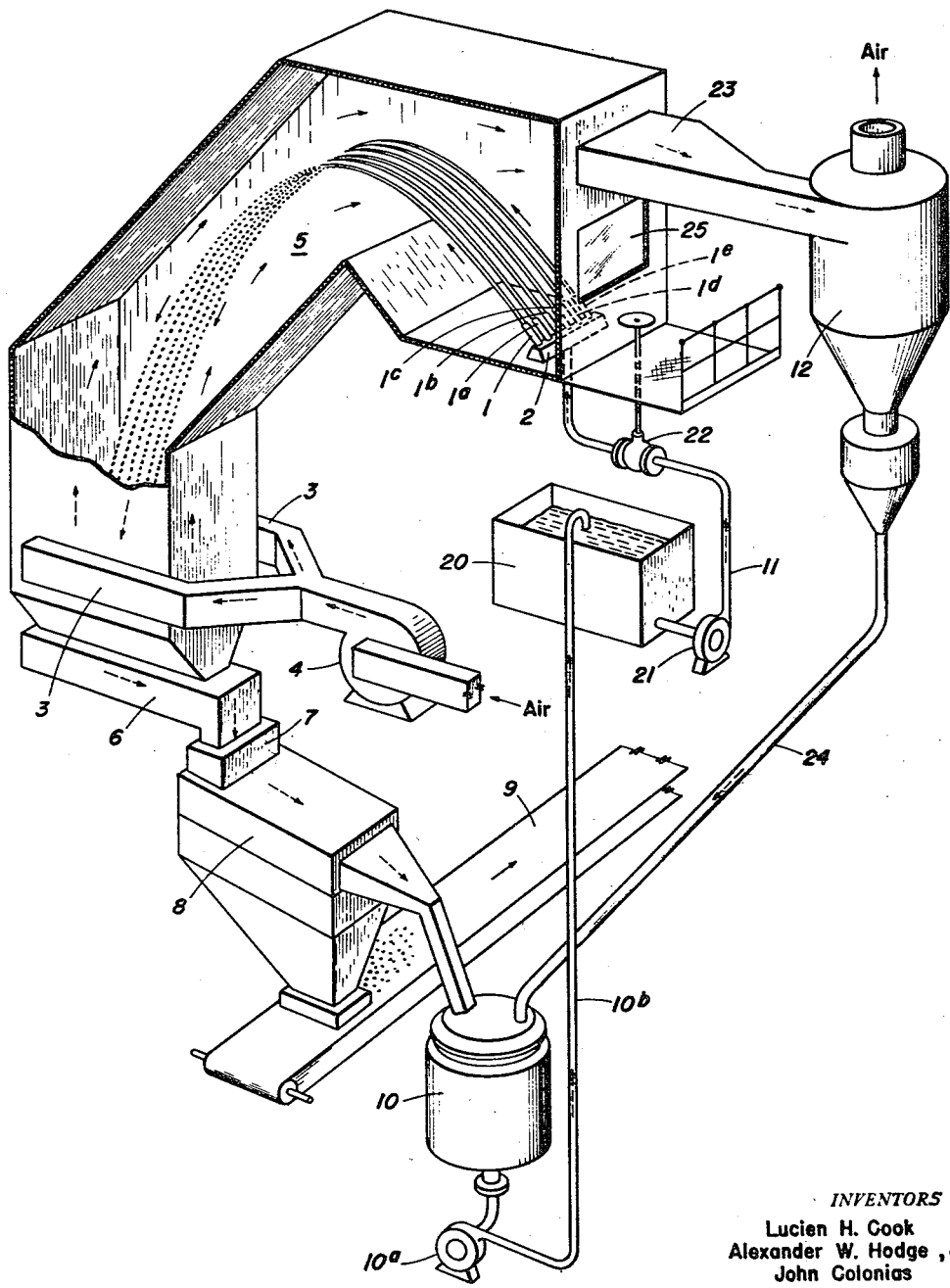

2,774,660

GRANULATION OF FERTILIZERS

Lucien H. Cook, Port Washington, and Alexander W. Hodge, Jr., South Ozone Park, N. Y., and John Colonias, Elizabeth, N. J., assignors to Chemical Construction Corporation, New York, N. Y., a corporation of Delaware Application April 26, 1954, Serial No. 425,362

15 Claims. (Cl. 71—64)

This invention relates to a process of granulating materials. More particularly, it relates to the comminution of materials while fluid, followed by solidification. More specifically, the invention is concerned with the prilling or granulation of nitrogen fertilizers, such as ammonium nitrate and urea.

In the past, a nitrogen fertilizer, such as urea or ammonium nitrate, was crystallized from highly concentrated aqueous solutions either by lowering the temperature of a supersaturated solution or by the removal of excess moisture therefrom. However, nitrogen fertilizers produced in this manner are not entirely satisfactory. This is because the crystals are hydroscopic, thereby readily absorbing moisture from the atmosphere. Consequently, the storing of these products presents a difficult problem, since the so-called crystals caked into a solid mass spreading this material on farmland by the customary fertilizer spreading machines was practically impossible. If the crystals, obtained from highly concentrated aqueous solutions, were ground to make a uniform product, excessive amounts of "fines" were obtained. This method, too, was unsatisfactory in that "fines" present a difficult handling problem.

Attempts have been made to solve these difficulties in the prior practices. Basically, the prior methods were concerned with the conversion of the fusion of the fertilizer into a spray at a temperature just above the melting point and allowing the drops to fall through a countercurrent flow of gas maintained at a temperature such that the drops solidify in their passage through the chamber thereby forming spherical granules. However, none of the spray methods were wholly successful since the trajectories of the spray droplets were random. As a consequence, serious problems arose in the design and operation of the chamber. Some of the difficulties encountered may be enumerated as follows:

(1) Drops with random trajectories strike the walls of the chamber and solidify thereon. This necessitates periodic shutdowns of the prilling plant for cleaning. Otherwise the accumulation of these drops would eventually form masses heavy enough to break away from the walls and fall to the bottom of the chamber in which case the base of the chamber must be structurally designed to withstand the impact of these masses. Masses weighing up to about 500 pounds have been known to accumulate in towers using sprays as a means of dispersing hot solutions.

(2) The resulting products withdrawn from the chamber contained excessive amounts of oversize or coarse material due to deposits on the walls which break off as well as "fines" produced by coalescence of random droplets which collide with one another due to the improper spraying of the molten material by prior art methods. This causes an overly large recirculating load, since large amounts of coarse and fine materials must be screened from the optimum range of particle sizes, and remelted.

(3) Extremely high towers and necessary foundations to support the high structure must be erected to carry out the prilling methods of the prior art.

It is a principal object of this invention to overcome the disadvantages and difficulties of the prior methods of granulating fertilizers which are present whenever solutions are sprayed from an orifice.

A further object of the invention is to reduce in a substantial amount the initial cost of building a prilling tower for granulation of fertilizer materials and to provide a smooth prilling operation.

A still further object is to provide for a uniform and moisture-stable fertilizer capable of being easily dispensed.

Other objects and advantages of this invention will be apparent from the following specification which describes the preferred embodiment of the invention.

As previously mentioned, the prior art is replete with methods of granulating materials by comminuting fluid streams. Therefore, it is surprising that by the simple expedient of the present invention it is possible to granulate materials in apparatus having lower initial cost and which makes a cleaner process and a more uniform product with less coarse and fine material being recycled to the melting pot for further processing.

In accordance with the method of the present invention, the granulation of nitrogen fertilizer is accomplished by heating the fertilizer to a temperature just above the melting point and jetting the fused or molten material into thin unidirectional streams through a countercurrent flow of drying gas. This unidirectional stream is obtained by forcing a solution through a long tube at high pressures in order to deliver a continuous stream of liquid. The tube is of sufficient length to eliminate eddy currents in the liquid before the stream reaches the nozzle tip. This precaution eliminates random particles being discharged at an angle and interfering with liquid streams being ejected from other nozzzles. The thin streams first flow upwardly and then break up into droplets which fall through a countercurrent flow of gas at such temperatures that the drops solidify in their passage through the chamber to form spheroid-shaped granules. It is thought that the term "oblate spheroid" would more closely describe the shape of the granule.

The fact not appreciated by the various industries which employ granulating processes is that the upwardly flowing stream of liquid should not be sprayed or scattered, but should continue in an uninterrupted unidirectional stream until it tends to separate by the forces of surface tension. In other words, the stream proceeds upwardly at an acute angle while maintaining about the same cross section as the diameter of the nozzle until at a point preferably near the top of the trajectory and tends to form droplets in the shape of spheroids whose shortest axis is slightly larger than the diameter of the fluid stream as it emerges from the nozzle. The thus-formed droplets pass over the highest point of the trajectory and begin to fall freely through a countercurrent of gas which removes a small percentage of the water from the droplets. This removal of moisture and cooling effect of the rising current of air causes a hard film or crust to form on the droplets, thereby imparting resistance to abrasion and other deforming forces.

The accompanying diagrammatic perspective figure is illustrative, but not necessarily limitative of the tower used for carrying out the prilling, wherein a stream of fused material is directed into parabola-like trajectory.

While the apparatus for practicing the invention may be varied in form, the apparatus shown in the accompanying figure is the type preferred. In this apparatus, liquid in tank 20 is fed by means of feed pump 21 through a conduit 11 under pressure through nozzles 1, 1a, 1b, 1c, 1d, and 1e, which are tilted so that the ejected fusions are directed upwardly at an angle to the horizontal of about 45°. The flow of the liquid may be controlled by an on-off valve 22. Any type of nozzle which prevents a random distribution of fused material could be used. The nozzles are suitably mounted in a jet header 2. Air is forced in near the bottom of chamber 3 by means of fan 4. As the droplets begin to fall freely they solidify by reason of the lower temperature of the rising current of air and they are partially dried. This drying occurs chiefly on the outer section of the granule. A hard crust forms on the granule which is hard enough to prevent the formation of fines when granules rub against one another or against the apparatus such as the sides of the hopper at the bottom of the tower. The granules are also hard enough to resist abrasion to a greater degree during a screening operation. The hard exterior of the granules also prevents deformation when there is considerable over burden, as in storage bins. Another benefit derived from these hardened granules is the fact that the granules exhibit very little tendency to cake while being stored temporarily awaiting further heat treatment in a rotary or other types of kilns. The partially dried granules or pellets collect in the hopper at the bottom of chamber 5, are removed from the hopper by conveyor 6 to an elevator 7, which directs the granules onto screen 8. Here the oversize and undersize particles are screened out and delivered to dissolver 10 wherein the rejected material is remelted and pumped by means of pump 10a through conduit 10b to feed tank 20 for regranulation. The correctly sized material from screen 8 is transferred to storage or to packaging by conveyor 9. The countercurrent air having passed through the chamber 3 is withdrawn from the chamber at 23 and then passes through a conduit to a dust collector 12. Air is eliminated therefrom. Collected fines thereafter flow through conduit 24 to the dissolver 10 where they are remelted and returned to the feed tank 20 for further processing through nozzles 1. The entire operation may be observed by the operator through a sight glass 25.

While one granulator is shown for the sake of simplicity, two and more such granulators may be used if so desired.

The above apparatus is advantageously used in the preparation of such fertilizers as urea and ammonium nitrate and will be described in the prilling or granulating of urea. Urea made by several well-known processes wherein the final solution contains about 95% urea and 5% water can be used in accordance with our process. It is within the purview of the present invention to utilize from 1% to 15% water and 99% to 85% urea. However, the most practical and preferred range is 93% to 97% urea and the remainder water. Urea contents below 93% would involve too long a drying operation. Consequently, prilling towers would have to be higher to give a longer residence time in order to form an appropriate crust. A urea content above 95% is also feasible, but the temperatures necessary to keep the urea plus water in a liquid state are higher as the water content decreases.

When the temperature of the urea solution reaches 266° F., the urea therein begins to decompose rapidly to form biuret and other deaminated contaminating products. In addition to contaminating the final product, the contaminating products will also lower the available nitrogen content of the urea fertilizer. While the urea solution may be heated to 266° F., the preferred operating range of temperatures is 235° F.–255° F.

Urea is initially fused and projected out of a long stem nozzle. The velocity of the fused urea stream may vary widely. However, the stream must have enough velocity to continue as an uninterrupted stream until the forces involved in the phenomena of surface tension act to gradually form droplets from the stream of fluid material. Generally, a range of from 10 to 35 feet per second may be employed. A good operating range is from 20–30 ft./sec. Any higher velocities would cause the stream of urea to atomize, thereby forming a non-uniform product. The lowest velocity, of course, is limited by the character of the solution being forced through the jet nozzle. Accordingly, the fused material is jetted under pressure. This pressure will vary, of course, with the material being prilled. Urea requires less pressure, whereas ammonium nitrate requires more. Usually this range is from about 15–60 p. s. i. g.

Another controlling factor in the jetting of urea is the diameter of the nozzle. The diameter could possibly be as large as ⅛ inch. However, a preferred range for nozzle orifice diameters is from ¹⁄₃₂ inch to ¹⁄₁₆ inch. Nozzles having orifice diameters below ¹⁄₃₂ inch are difficult to construct while diameters above ³⁄₃₂ inch form prills which are generally too large for efficient removal of water. Further, as mentioned previously, the nozzle tube length must be sufficiently longer to deliver a continuous stream of liquid. This tube length is from 5 to 10 inches, advantageously from 6 to 8 inches.

The streams of fused material are projected upwardly at an angle from the horizontal plane which varies between 30°–60°. A flat trajectory requires a higher pressure for projection which causes a random projection of droplets. The average height to which the fused material is projected is usually about 10–12 feet. However, this depends on the velocity of the stream, the viscosity of the solution, angle of the nozzle, etc.

As the granulated material falls through the tower, it passes through an upwardly rising current of an inert gas, such as air, oxygen or nitrogen, traveling at a preferred velocity of about ⅛–6 ft./sec. If the gas velocity is much over 6 ft./sec., there is danger of the solution solidifying into irregular shapes before spheroids are formed. If the velocity is much below ⅛ ft./sec. the tower would have to be unduly extended to obtain the required drying. It is conceivable that with an abnormally high tower the granulation could be accomplished with countercurrent gas which has a barely perceptible movement. At the other extreme of gas velocity the rate could be about that of the falling particle. However, for reasons of economy the preferred range given above has been found to be the most suitable.

The temperature of the countercurrent inert gas should be maintained between that at which the stream of droplets are frozen or solidified and that at which no solidification of the granules takes place. This temperature range is between 50° F. and 100° F. If air is used, the amount of moisture in the air entering the chamber is immaterial, although a comparatively dry atmosphere is to be preferred, because the retention time in the granulator could be somewhat shortened for a dry atmosphere. However, if the atmosphere entering the lower end of the tower should be about 90° F. and saturated with water the effect would not be adverse. The reason for this lack of concern about the moisture content of the incoming air stems from the fact that an increase of 10° F., which would be imparted to the air by the incoming fused material, would increase the capacity of the air to absorb water in a degree much greater than the amount of water to be removed from such materials as urea or ammonium nitrate in order to form a hardened prill.

While the above description has been related with respect to urea, it is to be understood that the same process with modifications arising from differences in surface tension and melting temperatures also relates to the prilling of ammonium nitrate, mixtures of ammonium nitrate and ammonium phosphate, etc. One skilled in the art could readily determine the limitations necessary for prilling substances other than urea.

The invention will be further illustrated by the following examples, but it is not to be construed as limited thereto.

*Example 1*

This example illustrates the prilling of a fused urea solution in accordance with the above description. Three runs were made wherein the following operating conditions were maintained:

| | Runs | | |
|---|---|---|---|
| | 1 | 2 | 3 |
| Nozzle angle_____degrees__ | 45 | 45 | 45 |
| Nozzle internal diameter size_____in__ | 1/32 | 1/32 | 1/32 |
| Nozzle length_____do__ | 6 | 6 | 6 |
| Air velocity_____ft./sec__ | .25 | .25 | .25 |
| Air temperature, °F.: | | | |
| Dry_____ | 62 | 65 | 86 |
| Wet_____ | 45 | 45 | 62 |
| Urea solution temp_____°F__ | 254 | 253 | 253 |
| Urea pressure_____p. s. i. g__ | 18 | 15–19 | 17–23 |

In all three runs, a urea solution was jetted through a nozzle into a tower with countercurrent air contact. The solids were collected in the bottom of the tower and analyzed for particle size. The results are tabularized below.

| Screen Analysis of Product | Weight Percent Runs | | |
|---|---|---|---|
| | 1 | 2 | 3 |
| +.097"_____ | 1.29 | 3.46 | 11.7 |
| −.097" to +.055"_____ | 69.24 | 56.42 | 57.8 |
| −.055" to +.045"_____ | 17.90 | 18.16 | 25.7 |
| −.045" to +.033"_____ | 5.73 | 10.03 | 2.1 |
| −.033"_____ | 5.84 | 11.93 | 2.7 |

*Example 2*

Three runs were made with ammonium nitrate in accordance with the method of Example 1. The operating conditions are as follows:

| | Runs | | |
|---|---|---|---|
| | 1 | 2 | 3 |
| Nozzle angle_____degrees__ | 45 | 45 | 30 |
| Nozzle internal diameter size_____in__ | 1/32 | 1/32 | 1/32 |
| Nozzle length_____do__ | 6 | 6 | 6 |
| Air rate_____ft./sec__ | .31 | .31 | .31 |
| Air temperature, °F.: | | | |
| Dry bulb_____ | 78 | 81 | 74 |
| Wet bulb_____ | 68 | 76 | 73 |
| Ammonium nitrate temp_____°F | 280–285 | 285 | 280 |
| Ammonium nitrate pressure_____p. s. i. g__ | 50 | 50 | 50 |

The product was collected and analyzed. This analysis is tabularized below:

| Screen Analysis of Product | Weight Percent Runs | | |
|---|---|---|---|
| | 1 | 2 | 3 |
| +0.097"_____ | 0.8 | 2.0 | 0.4 |
| −0.097" to +0.055"_____ | 54.6 | 15.3 | 65.7 |
| −0.055" to +0.045"_____ | 24.7 | 20.2 | 22.5 |
| −0.045" to +0.033"_____ | 13.3 | 23.8 | 9.5 |
| −0.033"_____ | 6.7 | 3.7 | 1.9 |

Other than the many advantages offered by the method of the present invention mentioned previous, perhaps the paramount advantage resides in the economy achieved in equipment costs. The towers used in the present process are about half the height of the towers now used in the industry. For example, in a recent article directed to prilling of ammonium nitrate appearing in Industrial and Engineering Chemistry, March 1953, pages 496–504, a tower of 100 feet in height and 20 feet in diameter is described. Further, U. S. Patent No. 2,382,298, to Datin, describes a tower that is 80 feet high. In contrast thereto, the prilling of the instant invention is accomplished in a tower which will only need to be a maximum of about 40 feet in height. In fact, a tower of about 25 feet in height would successfully carry out operations when higher inert gas velocities are maintained in the tower. Smaller foundations are needed to support this type of tower. From these figures it is readily seen that a startling advantage is gained in savings in materials of construction used in the tower needed for this invention. Operation costs in the method of our invention are also smaller because the product is more uniform than is the product of the prior practices with considerably less attendant coarse and fine particles to be remelted and recycled to the jet nozzles.

We claim:

1. The process for the production of uniform and moisture-stable granules of a nitrogen fertilizer which comprises: heating said nitrogen fertilizer to a temperature slightly above its melting point; jetting the resulting molten fertilizer upwardly under a positive pressure into an uninterrupted, unidirectional stream consisting of a homogeneous body of liquid; separating such stream into droplets by the forces of gravity and surface tension; countercurrently contacting said droplets with an inert cooling gas and thereby removing moisture from said droplets; and recovering a uniform and moisture-stable product.

2. The method according to claim 1 in which the fertilizer is urea.

3. The method according to claim 1 in which the fertilizer is ammonium nitrate.

4. The process for the production of uniform and moisture-stable granules of a nitrogen fertilizer which comprises: heating said nitrogen fertilizer to a temperature slightly above its melting point; jetting the resulting molten fertilizer at an acute angle upwardly under a positive pressure into uninterrupted, unidirectional stream consisting of a homogeneous body of liquid; separating such stream into droplets by the forces of gravity and surface tension; countercurrently contacting said droplets with an inert cooling gas and thereby removing moisture from said droplets; and recovering a uniform and moisture-stable product.

5. The method according to claim 4 in which the fertilizer is urea.

6. The method according to claim 4 in which the fertilizer is ammonium nitrate.

7. The method according to claim 4 in which the inert cooling gas is air.

8. The method for prilling nitrogen fertilizers which comprises: heating a nitrogen fertilizer to a temperature slightly above its melting point; jetting into the upper portion of a zone said resulting molten fertilizer under a positive pressure at an acute angle through a plurality of elongated, small internal diameter jets into uninterrupted, unidirectional streams consisting of homogeneous bodies of liquid; separating each stream into droplets by the forces of gravity and surface tension; contacting the latter droplets with an inert cooling gas introduced at the lower portion of the zone and maintained at a temperature below that of said droplets and thereby removing moisture from said droplets and producing prills therefrom; and withdrawing the thus-formed prills from said lower portion of the zone.

9. The method according to claim 8 in which the fertilizer is urea and the temperature of said molten urea is from about 235° F. to 266° F.

10. The method according to claim 8 in which the fertilizer is ammonium nitrate and the temperature of said molten ammonium nitrate is from 280° F. to 285° F.

11. The method according to claim 8 in which the jetting angle is within the range of from about 30° to 60°.

12. The method according to claim 8 in which the jetting pressure is a positive pressure from about fifteen to about sixty pounds per square inch gauge.

13. The method according to claim 8 in which the inert cooling gas is air.

14. The method for the production of uniform and moisture-stable granules of urea which comprises: heating urea to 253° F. until molten; jetting into the upper portion of a zone said resulting molten urea upwardly under about eighteen pounds per square inch gauge pressure at an angle of 45° through a plurality of elongated, small internal diameter jets into streams consisting of homogeneous bodies of liquid; separating each stream into droplets by the forces of gravity and surface tension; contacting the latter with air introduced at the lower portion of the zone and thereby removing moisture from said droplets and producing prills therefrom; and withdrawing the thus-formed prills from said lower portion of the zone.

15. The method for the production of uniform and moisture-stable granules of ammonium nitrate which comprises; heating ammonium nitrate to a temperature of 280° F. until molten; jetting into the upper portion of a zone said resulting molten ammonium nitrate upwardly under about fifty pounds per square inch gauge pressure at an angle of 45° through a plurality of elongated, small internal diameter jets into streams consisting of homogeneous bodies of liquid; separating each stream into droplets by the forces of gravity and surface tensions; contacting the latter droplets with air introduced at the lower portion of the zone and thereby removing moisture from said droplets producing prills therefrom; and withdrawing the thus-formed prills from said lower portion of the zone.

References Cited in the file of this patent

UNITED STATES PATENTS

| | | |
|---|---|---|
| 656,253 | Kunstner | Aug. 21, 1900 |
| 1,239,221 | Rodman | Sept. 4, 1917 |
| 1,584,875 | Lidholm | May 18, 1926 |
| 1,613,334 | Symmes | Jan. 4, 1927 |
| 1,773,257 | Buse | Aug. 19, 1930 |
| 1,837,869 | Jewett et al. | Dec. 22, 1931 |
| 1,869,235 | Bartling | July 26, 1932 |
| 1,951,790 | Curran | Mar. 20, 1934 |
| 1,989,684 | Cox | Feb. 5, 1935 |
| 2,280,895 | Datin | Apr. 28, 1942 |
| 2,382,298 | Datin | Aug. 14, 1945 |